UNITED STATES PATENT OFFICE 2,486,374

BENZOIC ACID ESTERS OF ALICYCLIC (SECONDARY) AMINO ALKANOLS

Arthur C. Cope, Belmont, Mass., assignor to Sharp & Dohme, Incorporated, Philadelphia, Pa., a corporation of Maryland No Drawing. Original application May 31, 1944, Serial No. 538,201. Divided and this application June 26, 1946, Serial No. 679,577

5 Claims. (Cl. 260—477)

This invention relates to benzoic acid esters of alicyclic (secondary) amino-propanols and -butanols, in which the alicyclic group, if substituted, is wholly hydrocarbon and has a total of less than eleven carbon atoms and is selected from the unsubstituted and alkyl-substituted cyclohexyl groups. These esters are useful as local anesthetics, in general, combining high effectiveness with relatively low toxicity, and are relatively non-irritating.

The compounds of the invention are represented by the general formula

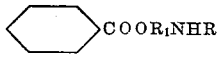

in which R represents a hydrocarbon alicyclic group attached to the amino nitrogen and having a total of less than eleven carbon atoms and selected from the unsubstituted and alkyl-substituted cyclohexyl groups, and $R_1$ represents the divalent alkylene group, residue of the propanol or butanol, and has a total of at least three and less than six carbon atoms and with at least two and less than four carbon atoms linked in sequence between the nitrogen and the oxygen.

Thus, it is seen that both the alkyl substituent on the amino group and the amino group itself are secondary, and that the secondary amino group is derived from ammonia by replacing one of its hydrogens by the hydrocarbon alicyclic substituent and a second hydrogen by the alkylene group. Accordingly, in this specification and in the claims the expression "alicyclic-(secondary)amino" is used to describe the alicyclic-amino grouping on the propanol- and butanol-amine portion of the ester compounds of the invention and to show that the amino group is always secondary and that the alicyclic substituent on the amino group is always secondary as one of its nuclear carbons is linked to the nitrogen.

The alicyclic substituent on the amino group of the alkylaminoalkanol portion of the ester compounds of the invention contains at least six and no more than ten carbon atoms and may be unsubstituted as the cyclohexyl radical, or mono- or poly-substituted as with other alkyl groups as in the 4-methylcyclohexyl, 4-ethylcyclohexyl radicals and the like.

The esters of the invention are prepared by suitable reaction between benzoic acid anhydride or a benzoyl halide such as benzoyl chloride or bromide with the desired alicyclic(secondary)-amino-propanol or -butanol. In preparing the esters starting with an alkylaminoalkanol containing a non-tertiary alcohol group, the benzoyl halide or benzoic acid anhydride is reacted with an addition salt of the desired alicyclic-aminoalkanol containing the desired alicyclic substituent on its amino group. An advantageous procedure for condensing the benzoyl compound with the salt of the aminoalkanol is to dissolve the aminoalkanol in an inert solvent such as a chlorinated lower paraffin hydrocarbon as chloroform or methylene chloride and the like and to convert it to its addition salt such as the hydrochloride by saturating the solution with dry hydrochloric acid gas, with cooling, and then to add to the solution an equal molal quantity of the benzoyl halide as benzoyl chloride dissolved in an equal quantity of the same solvent, and heating the reaction mixture under reflux at 50 to 60° C., or higher, but preferably at the lower temperature range, then cooling the reaction mixture and removing the solvent under vacuum, and if the free base is desired, then treating the reaction product suspended in water with sufficient suitable alkali as sodium carbonate monohydrate to liberate the free amino ester.

The invention may be illustrated by, but not restricted to, the following examples:

*Example 1.*—*2-cyclohexylamino-1-butyl benzoate hydrochloride.*—A solution of 0.1 mol of 2-cyclohexylamino-1-butanol in 30 grams of chloroform was saturated with dry hydrogen chloride gas, with cooling. A solution of 0.1 mol of benzoyl chloride in 30 grams of chloroform was added and the solution was heated in a bath at 50–55° C. for four days under a reflux condenser protected from atmospheric moisture. Then the solvent was removed by vacuum distillation while the mixture was warmed on a water bath. Benzene was then added to the syrupy residue and the reaction product crystallized out after the benzene was removed by vacuum distillation. The crystallized solid residue was washed with anhydrous ether to remove any unreacted benzoyl chloride. The 2-cyclohexylamino-1-butyl benzoate hydrochloride obtained was purified by two recrystallizations from absolute alcohol. It melted at 166–167.5° C.

*Example 2.*—2-cyclohexylamino-1-propyl benzoate hydrochloride melting at 195–196° C. results by replacing the alicyclicaminoalkanol of Example 1 by the molal equivalent quantity of 2-cyclohexylamino-1-propanol.

*Example 3.*—1-cyclohexylamino-2-propyl benzoate hydrochloride melting at 177–178.5° C. results by replacing the alicyclicaminoalkanol of Example 1 by the molal equivalent quantity of 1-cyclohexylamino-2-propanol.

Included also as having similar local anesthetic use are other cyclohexyl-(secondary)amino-alkyl benzoates obtained from alkylamino-alkanols having a nontertiary alcohol group. These benzoates embrace those having no substituent on the cyclohexyl nucleus as well as those having a lower alkyl radical linked to one or more of the cyclohexyl nuclear carbons. Preferably in those having such hydrocarbon substituent on the cyclohexyl group, the total number of carbon atoms in the substituted cyclohexyl group is less than eleven. These benzoates are prepared by the same procedure as disclosed in Example 1 by replacing the 2-cyclohexylamino-1-butanol of Example 1 by the corresponding cyclohexyl(secondary)aminoalkanol, for example, 1-(4-methylcyclohexyl)amino-2-propanol, 2-(4-methylcyclohexyl)amino-1-butanol, 3-cyclohexylamino - 1 - propanol, 1-(4-ethylcyclohexyl)amino - 2 - propanol, 2-cyclohexylamino-2-methyl - 1 - butanol, and 2-cyclohexylamino-2-methyl-1-propanol, to give additional cyclohexyl(secondary)amino - alkyl benzoates, respectively as follows:

1-(4-methylcyclohexyl)amino-2-propyl benzoate hydrochloride,
2-(4-methylcyclohexyl)amino-1-butyl benzoate hydrochloride,
3-cyclohexylamino-1-propyl benzoate hydrochloride,
1-(4-ethylcyclohexyl)amino - 2 - propyl benzoate hydrochloride,
2-cyclohexylamino-2-methyl - 1 - butyl benzoate hydrochloride, and
2-cyclohexylamino-2-methyl-1-propyl benzoate hydrochloride.

In preparing the esters starting with an alkyl-aminoalkanol containing a tertiary alcohol group, the desired alicyclicaminoalkanol having the tertiary alcohol group and containing the desired alicyclic substituent on its amino group is reacted with a substantial excess such as a 50% excess of the benzoyl halide or benzoic acid anhydride to form the corresponding benzamide, that is the N-benzoyl derivative of the selected alicyclicaminoalkanol, which amide is then rearranged to the corresponding ester hydrochloride, for example, by boiling in absolute alcohol with an excess of concentrated hydrochloric acid. Such procedure may be illustrated by, but not restricted to, the following example:

*Example 4.—1-cyclohexylamino-2-methyl - 2 - propyl benzoate hydrochloride.*—0.15 mol of benzoyl chloride in 100 cc. of methylene chloride was added rapidly to a vigorously stirred suspension of 0.1 mol of 1-cyclohexylamino-2-methyl-2-propanol in 200 cc. of 5% aqueous sodium hydroxide. The mixture, vigorously mechanically stirred, was heated on a water bath so that the methylene chloride refluxed for one hour. The reaction mixture was cooled and separated into two layers. The aqueous layer was extracted once with methylene chloride and the extract was combined with the methylene chloride layer and the combination was washed twice with water and concentrated under vacuum to dryness.

The dry benzamide of 1-cyclohexylamino-2-methyl-2-propanol was recrystallized once from ether and pentane and melted at 77.5–78° C. It was then rearranged to its corresponding benzoate hydrochloride by boiling a solution of 0.05 mol of the benzamide in 250 cc. of absolute alcohol with a 60% molar excess of concentrated hydrochloric acid for five minutes. Then the solution was cooled and vacuum distilled to dryness. The residue was further dried by adding benzene and reconcentrating under vacuum, and then recrystallized from acetone. The thus purified 1-cyclohexylamino-2-methyl - 2 - propyl benzoate hydrochloride melted at 162–163° C.

The esters of the invention are thus prepared from a wide variety of alicyclicamino-alkanols selected from the -propanols and the -butanols, which alkanols then include a wide variety of such as the 2-alicyclic(secondary)amino - 1 - alkanols, and 3-alicyclic(secondary)amino - 1 - alkanols, and also 1-alicyclic(secondary)amino -2-alkanols, in all of which the alkanol group is selected from the propanol and butanol groups, which alkanol groups may contain the alicyclic-amino grouping as the sole substituent or may contain additional substituents on the alkanol carbons, such as an alkyl radical, preferably a lower alkyl radical, on the 2- and 3-carbon atoms.

The various suitable alicyclic(secondary)amino-propanols and -butanols advantageously may be prepared by condensing a ketone with a primary amino alcohol, with simultaneous or subsequent reduction, the mechanism of which is the formation of an intermediate alkylidene amino alcohol, or the formation of an intermediate oxazolidine or the formation of an intermediate mixture of both. Such advantageous procedure is described in my copending application Serial No. 489,499, filed June 3, 1943 (now abandoned), reference to which is made for details of such procedure.

While the various Examples 1 through 10 show the preparation of the benzoate hydrochloride, if the free base is desired instead, it is prepared by dissolving or suspending the hydrochloride in a small volume of alcohol, diluting with water and treating with an excess over the stoichiometric quantity of sodium carbonate. The liberated free base is extracted with benzene and recovered therefrom in known manner. If a salt of an acid other than hydrochloric acid is desired, then to a solution of the free base, for example, in benzene, there is added the stoichiometric quantity of the particular acid of which the addition salt is desired, and the solvent is then removed by evaporation, under vacuum if desired, and the desired addition salt obtained by crystallization.

The anesthetic compounds of the invention are the free amines, that is, the free bases. Ordinarily they are used in the form of addition salts, for example, as a hydrochloride, sulfate, sulfamate, tartrate, glycolate or other addition salt, as the free amines or bases are quite insoluble in water. The selected salt should have sufficient solubility in water to be completely soluble in the concentrations used, usually of the order of 1% or less. The hydrochlorides and the glycolates are among those particularly therapeutically effective. The esters in which the alicyclic substituent on the amino group contains six carbon atoms in the alicyclic nucleus and, if hydrocarbon substituted has less than eleven carbon atoms, are particularly effective.

While these various individual illustrations of the benzoic acid esters of the invention have been separately named as a certain butyl benzoate or as a certain propyl benzoate, as exemplified in starting with 2-cyclohexylamino-1-butyl benzoate as in Example 1 and continuing from there through the disclosure ending with 2-cyclohexylamino-2-methyl-1-propyl benzoate, insofar as nomenclature is concerned each of the various individual esters embraced in the invention is either a benzoic acid ester of an alicyclic(secondary)-amino-propanol or of an alicyclic(secondary)-amino-butanol.

This application is a division carved out of my copending application Serial No. 538,201, filed May 31, 1944 (now abandoned), which in turn is a continuation-in-part of my copending application Serial No. 505,039 filed October 5, 1943, now Patent No. 2,442,721.

What is claimed is:

1. Alicyclic(secondary) amino-alkyl benzoates of the general formula

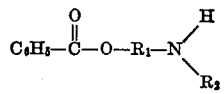

and their hydrochlorides, in which $R_1$ is a divalent alkylene radical having a total of at least three and less than six carbon atoms with from two to less than four carbon atoms linked to sequence between the nitrogen and the oxygen, and in which $R_2$ is a hydrocarbon alicyclic radical having six carbon atoms in its ring and a total of less than eleven carbon atoms and is linked to the nitrogen by one of its ring carbons.

2. Alicyclic(secondary) amino-alkyl benzoates of the general formula

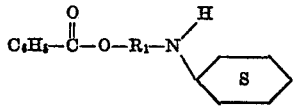

and their hydrochlorides in which $R_1$ is a divalent alkylene radical having a total of at least three and less than six carbon atoms with from two to less than four carbon atoms linked in sequence between the nitrogen and the oxygen.

3. A compound selected from the group consisting of 2-cyclohexylamino-1-propyl benzoate and its hydrochloride.

4. A compound selected from the group consisting of 1-cyclohexylamino-2-methyl-2-propyl benzoate and its hydrochloride.

5. A compound selected from the group consisting of 1-cyclohexyl-amino-2-propyl benzoate and its hydrochloride.

ARTHUR C. COPE.

REFERENCES CITED

The following references are of record in the file of this patent:

UNITED STATES PATENTS

| Number | Name | Date |
|---|---|---|
| 817,164 | Emilewicz | Apr. 10, 1906 |
| 1,513,730 | Adams et al. | Nov. 4, 1924 |
| 2,252,713 | Goldberg et al. | Aug. 19, 1941 |

OTHER REFERENCES

Blicke et al., "Jour. Am. Chem. Soc.," vol. 64 (1942), pp. 428–431.

Certificate of Correction

November 1, 1949

Patent No. 2,486,374  ARTHUR C. COPE

It is hereby certified that errors appear in the printed specification of the above numbered patent requiring correction as follows:

Column 5, line 15, for the patent number "2,442,721" read *2,442,797*; line 26, for the words "linked to" read *linked in*; and that the said Letters Patent should be read with these corrections therein that the same may conform to the record of the case in the Patent Office.

Signed and sealed this 21st day of March, A. D. 1950.

[SEAL]

THOMAS F. MURPHY,
*Assistant Commissioner of Patents.*